United States Patent
Miller et al.

[15] 3,684,188
[45] Aug. 15, 1972

[54] INSULATION APPLICATOR AND METHOD

[72] Inventors: Ray J. Miller, Harsens Island; Gerald W. Trabbic, Marshall, both of Mich.

[73] Assignee: Comfort, Inc., Battle Creek, Mich.

[22] Filed: Aug. 20, 1970

[21] Appl. No.: 35,998

[52] U.S. Cl. ............................................. 239/422
[51] Int. Cl. .......................................... F23d 11/16
[58] Field of Search............ 239/419.3, 421, 422, 425

[56] References Cited

UNITED STATES PATENTS

| | | | |
|---|---|---|---|
| 2,433,463 | 12/1947 | Lampe | 239/422 X |
| 2,585,133 | 2/1952 | Kempthorne | 239/422 |
| 2,732,258 | 1/1956 | Fisher | 239/422 X |
| 3,038,750 | 6/1962 | Nielsen | 239/422 X |
| 3,073,534 | 1/1963 | Hampshire | 239/422 |
| 3,185,396 | 5/1965 | Black | 239/422 X |
| 3,565,345 | 2/1971 | Moltzan | 239/419.3 |

*Primary Examiner*—Lloyd L. King
*Attorney*—Cullen, Settle, Sloman & Cantor

[57] ABSTRACT

Apparatus and method for applying particulate insulation to ceilings, walls, structural supports and the like. The apparatus includes a hopper for dry cellulose or other fibrous insulation material, an agitator mounted in the hopper near the bottom thereof, and a screw conveyor mounted in a trough in the bottom of the hopper. The forward end of the conveyor opens into the middle of a conduit having an open end through which air is being drawn by a centrifugal pump attached to the end of the conduit opposite the open end. A beater mounted is situated in the conduit. An application hose is connected to the outlet of the centrifugal pump, and a nozzle at the free end of the hose is adapted to mix the dry blown insulation with an aqueous glue solution. At the same time, air is injected in such a manner that substantially all of the mixing takes place in that intraconical space defined between a 45° right circular cone and a 60° right circular cone, the cones having identical bases defined by circularly arranged air injection ports located about the periphery of the nozzle and directed inwardly to define the intraconical space.

5 Claims, 10 Drawing Figures

PATENTED AUG 15 1972 3,684,188

INVENTORS
RAY J. MILLER.
GERALD W. TRABBIC.

Cullen, Settle, Sloman and Cantor
ATT'YS.

PATENTED AUG 15 1972

INVENTORS
RAY J. MILLER.
GERALD W. TRABBIC.
BY
Cullen Settle Sloman Canton
ATT'YS.

PATENTED AUG 15 1972 3,684,188

INVENTORS
RAY J. MILLER.
GERALD W. TRABBIC.
BY
Cullen Settle Sloman & Cantor
ATT'YS.

INSULATION APPLICATOR AND METHOD

BACKGROUND OF THE INVENTION

1. Field of the Invention

In recent years new methods of building construction have been developed utilizing lightweight structural metal trusses for roof supports. Normally, the roofing materials, usually large corrugated metal panels, are placed directly over the trusses, leaving no provision or space for ordinary insulating materials. As a consequence, new techniques of applying insulation directly to the undersides of the roofs, trusses, walls and other structural components have been devised where the insulation is ground up into particulate size, mixed with air and a glue solution and blown onto whatever it is desired to insulate. The glue sets almost immediately on application, and the insulation clings to the metal supports, roofing panels, walls and the like. Particulate insulation can be applied in the above manner to form a substantially continuous moisture proof, thermal insulating, sound absorbing and fire resistant cover on the underside of roofs, trusses, walls or anything else to which it is applied.

Asbestos and cellulose are the two common types of insulation which are applied in the above-described manner.

2. The Prior Art

The apparatus used in applying such insulation has, up to now, been expensive and too bulky to move about easily. Since this type of insulation is often applied to high rise office and apartment buildings, a need for inexpensive portable apparatus which can be easily moved, is apparent.

In addition, using the apparatus of the prior art, it has been extremely difficult to get uniform deposition of the insulation on walls, ceilings and other structural parts because of inadequate mixing of the aqueous glue solution with the dry insulation material. The result is that clumps of insulation form on the walls, or the insulation falls off after being applied. Inadequate mixing is due in part to poor nozzle design. Some nozzles have a tendency to clog up with glue, thus preventing the proper ratio of glue-water-insulation from being achieved.

It is an object of this invention to provide a simple portable inexpensive machine for applying insulation of the type described herein to roof panels, walls, ceilings, structural components and the like.

It is still a further object of this invention to provide a nozzle which has good resistance to clogging and which achieves uniform mixing of the various components being projected through it.

Other objects and advantages of this invention will appear in the following description and appended claims, reference being had to the accompanying drawings forming a part of this specification wherein like reference characters designate corresponding parts in the several views.

The Drawings

SUMMARY OF THE INVENTION

Figure 1:
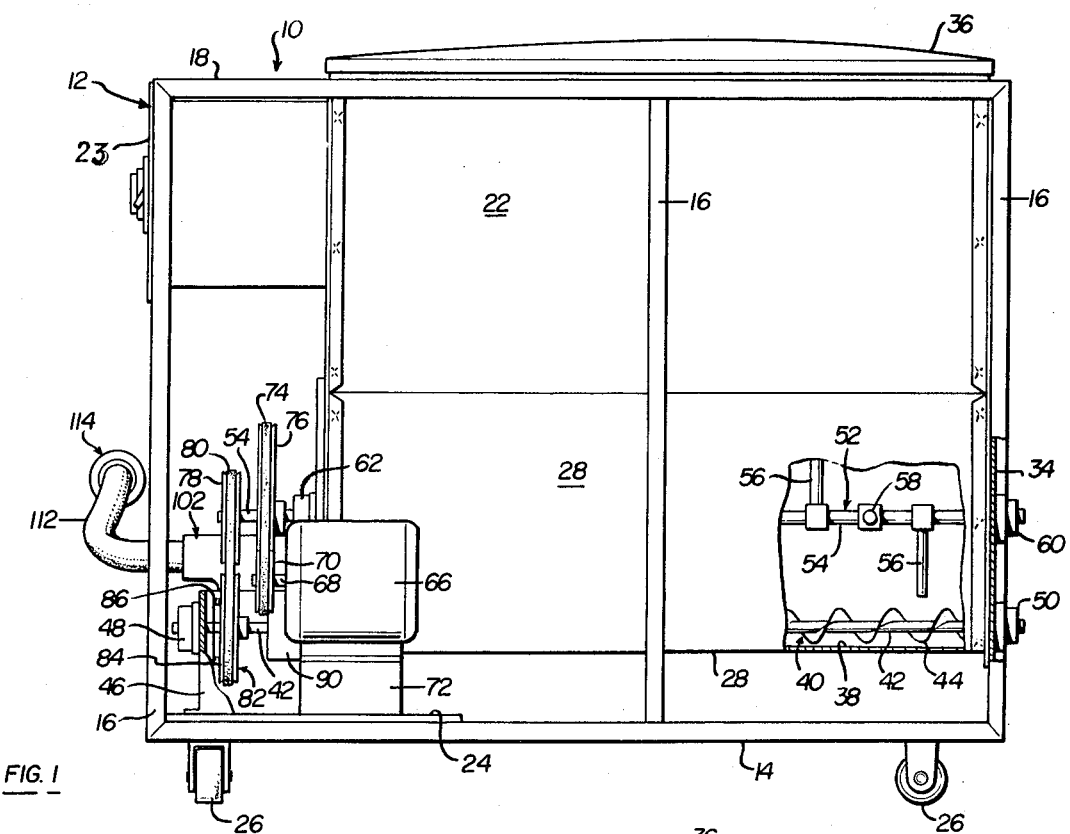
FIG. 1 is a side elevational view, with parts broken away, of the apparatus of the invention.

The invention is an apparatus and method for applying particulate insulation to ceilings, walls, structural supports and the like. The apparatus includes a hopper for dry cellulose or other fibrous insulation material, an agitator is mounted in the hopper near the bottom thereof, and a screw conveyor mounted in a trough in the bottom of the hopper. The forward end of the conveyor opens into the middle of a conduit having an open end through which air is being drawn by centrifugal pump attached to the end of the conduit opposite the open end and having a beater mounted on a shaft which extends into the conduit. An application hose is connected to the outlet of the centrifugal pump, and a nozzle at the free end of the hose.

The nozzle construction comprises a cylindrical center opening from which a mixture of air and fibrous material issues, and having a set of glue conduits having their discharge ends circumscribing the center opening. A first and second set of air conduits having their discharge ends coinciding with the discharge ends of the glue conduits are angularly disposed relative to the path of issuance of the air and material mixture, and to one another, to define distinct cones of air interposed in the path of issuance of the air and fibrous material mixture exteriorly of the nozzle. The cones of air atomize the glue and simultaneously deflect the glue into and admixes the glue with the mixture of air and fibrous material. Thorough mixing of the glue and fibrous material is thus achieved.

DESCRIPTION OF THE PREFERRED EMBODIMENT:

Referring to the drawings, the insulation applicator apparatus 10 of the invention comprises a rectangular box-like frame 12 formed of square tubing or other suitable structural members. The frame 12 comprises horizontal base members 14, vertical side members 16, horizontal top members 18, and intermediate horizontal supporting members 20 mounted between the vertical side members 16. Sheet metal 22 encloses the frame 12. An electrical panel 23 is mounted on the upper part of the front of the apparatus 10. The electrical panel contains all of the necessary outlets and switches to operate the apparatus. The panel can be easily removed for servicing of the electrical components contained on the back side thereof. The electrical system for the apparatus of this invention is conventional.

A horizontal base plate 24 is welded to the base member 14 at the front of the apparatus 10. Casters 26 are mounted on the underside of the frame 12 at the front corners and wheels 27 are mounted at the rear corners.

A box-like sheet metal hopper 28 is mounted inside the frame 12. A support plate 30 is attached to the front of the hopper 28 near the bottom with bolts 32 and a support plate 34 is attached to the back side of the hopper 28, also near the bottom. A lid 36 fits over the top of the hopper 28.

Figure 2:
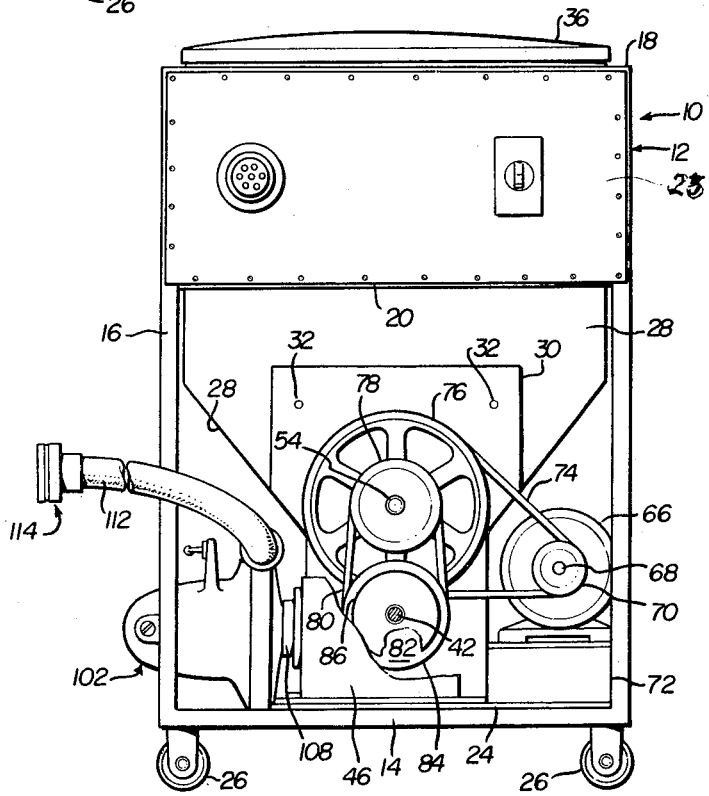
FIG. 2 is a front elevational view of the apparatus of the invention.
Figure 3:
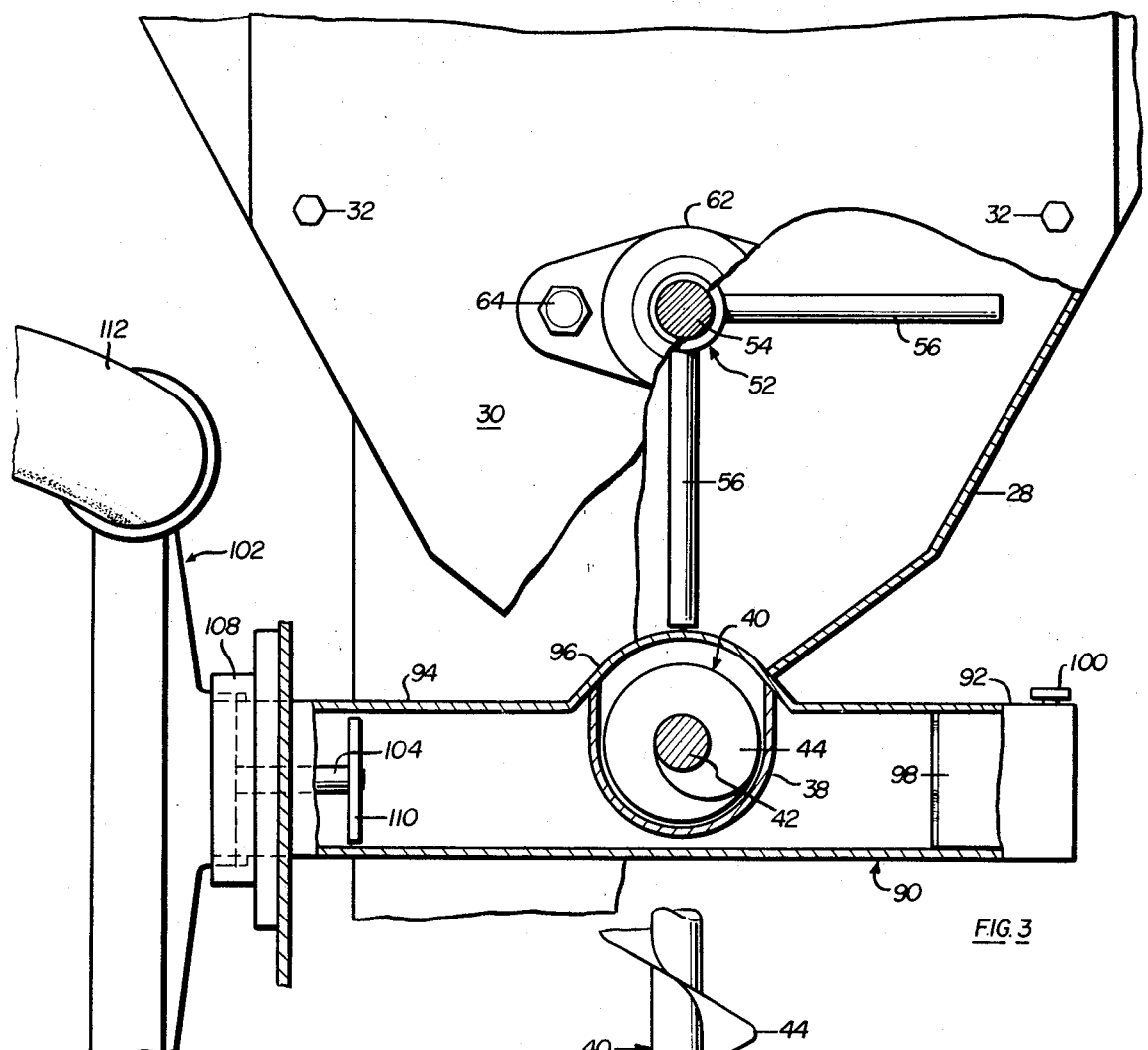
FIG. 3 is an enlarged view, with parts broken away, of a portion of the apparatus of the invention, showing the relationship of the hopper, the agitator, the screw, the venturi-shaped conduit and the centrifugal pump.
Figure 4:
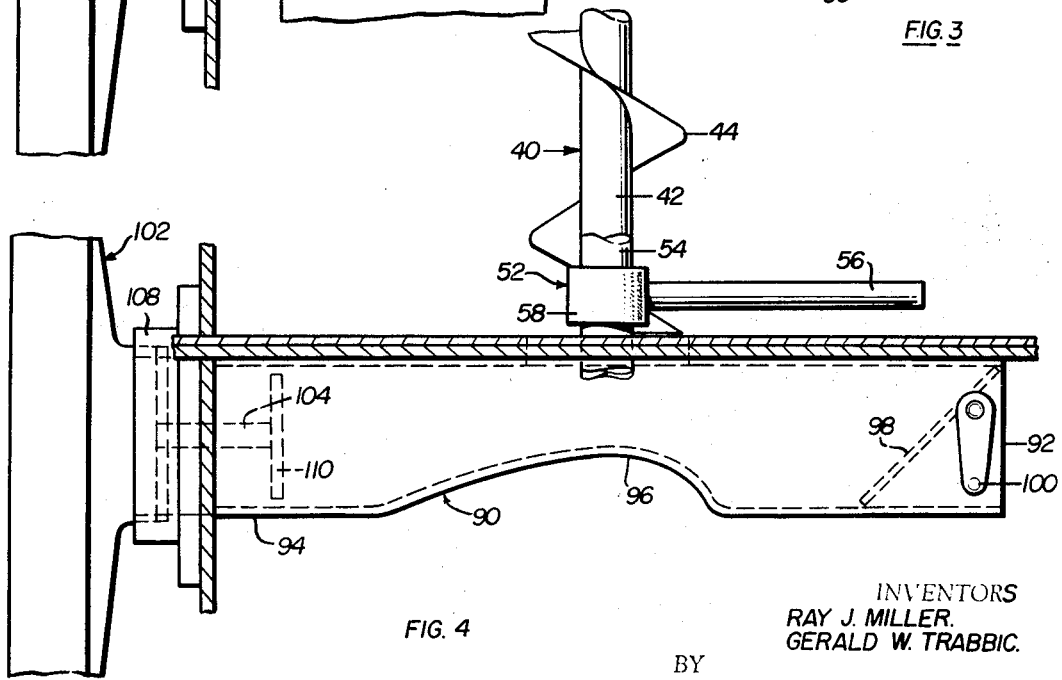
FIG. 4 is a top plan view, with parts broken away, showing the relationship of the agitator, the screw, the venturi-shaped conduit and the centrifugal pump components of the apparatus of the invention.

The bottom of the hopper 28 (FIGS. 1 and 3) is shaped to form a trough 38 and is substantially U-shaped in cross-section. The trough 38 is open at its forward end. A screw conveyor 40 comprising a shaft 42 and a spiral flight 44 mounted on the shaft 42 is horizontally mounted in the trough 38 at the bottom of the hopper 18. In a preferred embodiment the diameter of the shaft is 0.750 inch, the diameter of the screw conveyor 2 inches, and the flight 44 has a 2 inch pitch and is about 37 inches long. The front end of the shaft 42 of the screw conveyor 40 extends through an orifice (not shown) in a vertical support plate 46 (FIG. 2) welded to the base plate 24 and is supported by a set of bearings 48 which is fastened onto the outside surface of the vertical support plate 46. The rear end of the shaft 42 of the screw conveyor 40 extends through an orifice (not shown) in the support plate 34 and is supported by flange bolted bearings 50 attached to the support plate 34.

An agitator 52 is horizontally mounted within the hopper 28 substantially vertically above and parallel to the screw conveyor 40. The agitator 52 comprises a shaft 54 to which is attached a plurality of spaced-apart fingers 56. Each of the fingers 56 is fixed onto the shaft by means of a set screw 58. In the embodiment shown, the adjacent fingers 56 are spaced at 90° relative to each other around the shaft 54. Alternate fingers 56 face in opposite directions.

The shaft 54 of the agitator 52 is supported by bearings 60 mounted on the back panel 34 of the hopper 28 and bearings 62 mounted on the front support plate 30 with bolts 64. The agitator 52 serves to break up dry insulation material which is dumped into the hopper 28, preventing the material from bridging over the screw conveyor 40. A motor 66 having a shaft 68 with a pulley 70 on the end of the shaft 68 is mounted on a support box 72 which is in turn welded to the base plate 44 at one side of the hopper 28.

A drive belt 74 connects the pulley 70 mounted on the motor shaft 68 with a larger pulley 76 mounted on the forward end of the agitator shaft 54 adjacent the bearings 62. The agitator 52 is rotated by means of the motor 66 acting through the pulley 70, the drive belt 74, and the larger pulley 76. A smaller pulley 78 is mounted on the forward end of the agitator shaft 54 adjacent the larger pulley 78. A drive belt 80 connects the smaller pulley 78 to a dual track pulley 82, having a larger track 84 and a smaller track 86, located underneath the smaller pulley on the forward end of the shaft 42 of the screw conveyor 40, and a tension adjusting pulley 88 mounted on the vertical plate. The speed of the screw conveyor 40 will vary, depending on which track of the pulley 82 the drive belt 80 is riding on. The tension adjusting pulley 88 is used to adjust the tension on the drive belt 80 when the belt is moved from one track to the other on the pulley 82. Preferably, the relationship of the larger track 84 to the smaller track 82 is such that when the drive belt 80 is riding on the larger track 84, the screw conveyor 40 is rotated at about one-third the speed that it would if the drive belt 80 was riding on the smaller track 86.

The screw conveyor 40 empties its contents into a horizontal venturi conduit 90 mounted on the bottom of the support plate 30. The conduit 90 has two end sections 92, 94 and a constricted center section 96. The apex of the constructed center section 96 is on the center line of the screw shaft 42. In a preferred embodiment the cross-sectional area of each of the end sections 92 and 94 is four square inches, while the cross-sectional area of the center section 96 is about 3 square inches. Air is drawn in the end section 92 and passes into the constricted center section 96 which the screw conveyor 40 empties into, thus creating a venturi effect in the constricted section 96, i.e., the air flows faster in the constricted section 96 than it does in the end sections 92 and 94. This insures that material being dumped into the center section 96 by the screw conveyor 40 is removed at the maximum feasible rate. A damper 98 is mounted in the open end 92 of the conduit 90. The damper 98 regulates the amount of air which can be drawn into the conduit 90. When the damper is almost completely closed off, a denser air column is provided. The damper 98 is actuated by a handle 100 attached to it.

Figure 5:
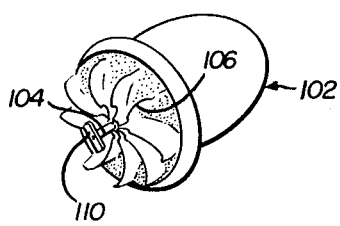
FIG. 5 is a perspective view of the centrifugal pump forming a part of the apparatus of the invention with the cover removed, showing the cut-outs in the impeller blades adjacent the extended shaft.
Figure 6:
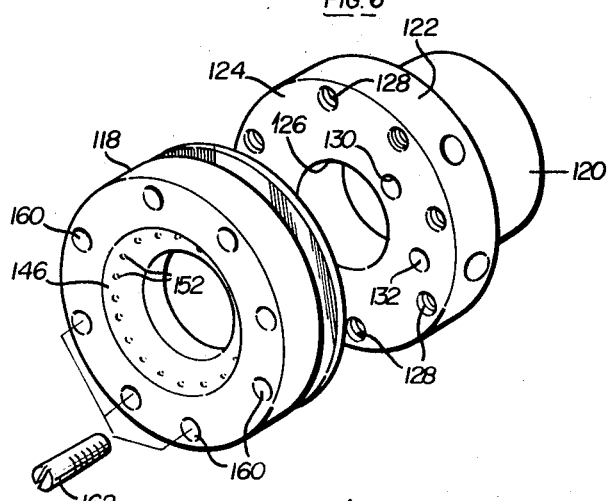
FIG. 6 is an exploded perspective view of the nozzle forming a part of the apparatus of the invention.
Figure 7:
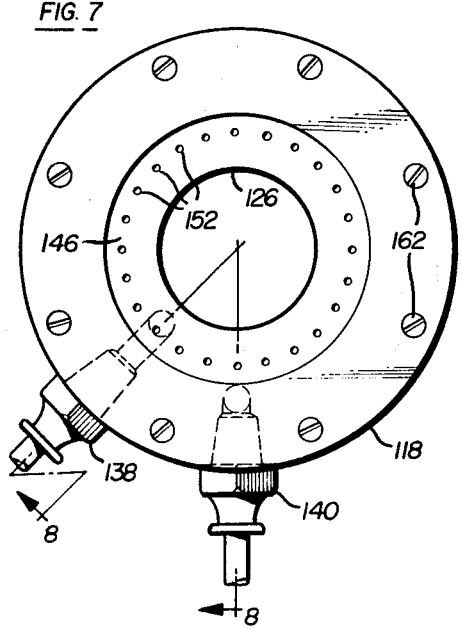
FIG. 7 is a top plan view with parts in phantom, of the nozzle shown in FIG. 6.

A centrifugal pump 102 having an elongated shaft 104, and impeller blades 106 which are cut back adjacent the elongated shaft 104, (see FIG. 5), is fixed at the end 94 of the conduit 90 opposite the open end 92 and joined to the conduit 90 by a collar 108. The blades 106 are cut back adjacent the elongated shaft 104 to permit material passing through the pump 102 along the shaft 104 from clogging at that point where the blades 106 and the shaft 104 would normally meet. The elongated shaft 104 extends into the end 94 of the conduit 90. A small beater 110 is mounted on the tip of the shaft 108. The length of the beater 110 approaches the minimum diameter of the conduit 90 at that point. The beater 110 serves to break up any clumps of material which may be dumped into the conduit 90 by the screw conveyor 40.

One end of a flexible hose 112 is attached to the mouth of the centrifugal pump 102. A nozzle 114 is attached to the other end. The construction of the nozzle 114 is of critical importance and is illustrated in FIGS. 6–10. The nozzle comprises a base 116 and a mixing head 118. The base 116 consists of a tubular collar 120 that is adapted to fit around the mouth of the flexible hose 112, and an outwardly projecting flange 122 on top of the collar. The flange 122 has a flat face 124, and a large cylindrical opening 126 in the center of the face 124 whose diameter corresponds in size to the interior diameter of the hose 112. The face 124 has a plurality of internally threaded screw receiving bores 128 cut into the periphery thereof, and two vertical bores 130 and 132. Bore 130 intersects the internal end of a horizontal bore 134 cut into the side of the flange 122, and bore 132 intersects the internal end of a horizontal bore 136 also cut into the side of the flange 122.

A connector 138 attached to a glue line is seated in the bore 134 and a connector 140 attached to an air line is seated in the other bore 136.

A gasket 142 is mounted intermediate the base 116 and the mixing head 118. The gasket 142 contains cutouts (not shown) corresponding in position to bore 130 and the bore 132.

The mixing head 118 is a circular disc-like piece having a cylindrical opening 144 in the center which corresponds in size to the cylindrical opening 126 in the flange 122 of the base 116. The edge of the head 118 around the cylindrical opening 144 is beveled at a downward angle of 30° relative to the surface of the head 118 forming a face 146. An annular groove 148 is cut into the under surface of the head 118 in a manner such that the bore 130 communicates with it, when the head 118 is in position on the base 116. A concentric annular groove 150 is also cut into the under surface of the base 116 and positioned so that the bore 132 empties into it, when the head 118 is fastened onto the base 116. Both grooves 148 and 150 are preferably internally beveled so that the beveled surfaces are parallel to the face 146.

Figure 9:
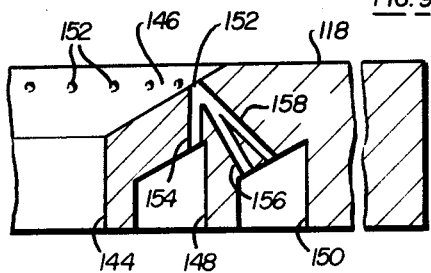
FIG. 9 is an enlarged fragmentary cross-sectional view of a portion of the mixing head of the nozzle, showing the relationship of the various passageways therein.

A plurality of orifices 152 are drilled into the face 146 of the head 118 at predetermined points around the periphery. As best seen in FIG. 9, each of the orifices 152 are located at the conjunction of three passageways, 154, 156 and 158, which have been drilled vertically relative to the upper surface of the head 118 and communicates in the interior of the head with the annular groove 148 carrying air. Each passageway 156 is drilled at a 30° angle relative to the vertical axis of the orifice 144 of the head 116(60° relative to a plane through its lower end parallel to the surface of the head 118) and communicates in the interior with the annular groove 150. Passageway 158 is drilled at a 45° angle relative to the vertical axis of the cylindrical opening 144 of the head 116, and it also communicates with the annular groove 150. The head 118 has a plurality of bores 160 around the periphery thereof which extend all of the way through. The head 118 is fastened to the base 116 with threaded screws 162 threaded into the bores 160 and the screw receiving bores 128 in the base 116. In the preferred embodiment the cylindrical opening 144 is 1.5 inches in diameter and the orifices 152 and passageways 154, 156 and 158 are 0.030 inch in diameter.

In an alternate embodiment every even numbered orifice 152 is the conjunction of a passageway 154 and a passageway 158, while every odd numbered orifice 152 is the conjunction of a passageway 154 and a passageway 156. Adequate mixing is also achieved in this manner, although the former arrangement is preferred.

If desired, a reducing ring 164 can be inserted into the throat of the nozzle 114 to reduce the cross-sectional area of the cylindrical openings 144 and 126 through which the insulation is discharged. The ring 164 extends into the flexible hose 112. The ring 164 has an outwardly sloping internal wall 155 at its lower end, thus a smooth transition is achieved between the internal wall 166 of the ring 164 and the internal surface of the flexible hose 112 at the point where they meet. This is to prevent build-up of insulation at this point. A screw 168 is used to attach the ring 164 to the base 116.

The electrical circuit for controlling the motor 66, the centrifugal pump 102, and the pumps supplying glue and air (not shown), is conventional and forms no part of the invention. The necessary switches and the like are conventionally mounted on the front face of the apparatus of the invention. If desired, a master switch (not shown) to shut off the whole apparatus can be mounted on a handle (not shown) attached to the nozzle 114.

Figure 8:
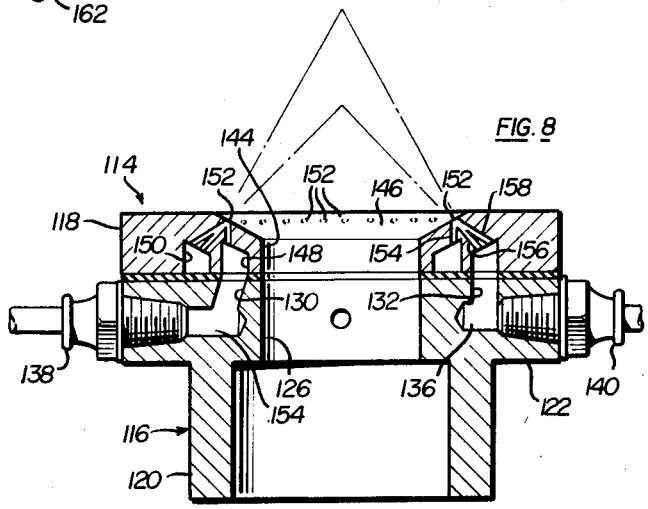
FIG. 8 is an enlarged cross-sectional view taken along planes 8—8 of FIG. 7.
Figure 10:
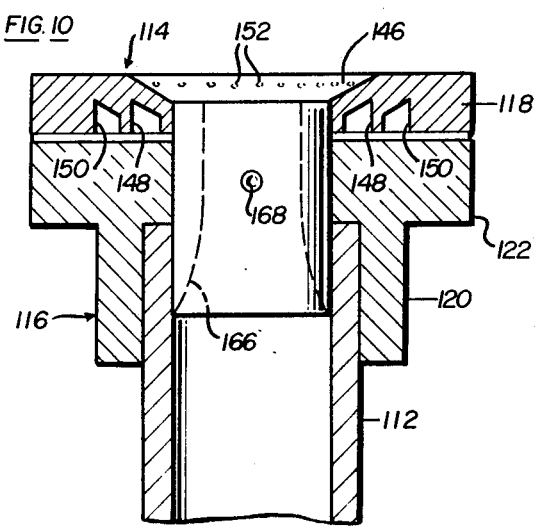
FIG. 10 is a view similar to FIG. 9 showing a modified nozzle utilizing a reducing ring in the throat of the nozzle.

As best visualized from FIG. 8, aqueous glue solution coming through each of the vertical passageways 154 is deflected at the orifices 152 by the air exiting from the passageways 156 and 158, respectively. This atomizes the glue and creates a mixing zone above the nozzle 114. The mixing zone is the intraconical space defined by an outwardly projecting 45° right circular cone and an outwardly projecting 60° right circular cone having identical vertical axes and identical bases, the vertical axes being defined by a circle through the orifices 152 in the face 146 of the nozzle 114. Cellulose or other material being sent through the flexible hose 112 and nozzle 114 is more thoroughly wetted in the mixing zone by the aqueous glue-air mixture, is deposited more uniformly, and sticks to whatever it is being applied to with less fall-off or drop-off than cellulose being applied with the apparatus of the prior art.

The process of this invention therefore comprises, in its simplest form, comminuting cellulose or other particulate material, projecting the material through the nozzle 114, and simultaneously with the projection mixing the material with a plurality of streams of air, and a plurality of streams of an atomized aqueous glue solution, wherein the substantial portion of the mixing takes place in the intraconical space formed as a result of the streams of air and deflected atomized glue solution being projected inwardly at angles of 45° ± 2° and 60° ± 2°, respectively, relative to a horizontal plane through the orifices 152.

The glue (a non-reversible glue) is admixed with water in a ratio of about 1 gallon of glue to 4–6 gallons of water. A preferred glue is sold by the H.B. Fuller Company under the product number E–6910. This glue is a synthetic resin emulsion of about 55 percent solids content having a ph of from 4.0 – 6.0, and a viscosity of about 2,500 cps at 3°/20°/85° F. It weighs 9 pounds per gallon.

The aqueous glue solution thus formed is projected in amounts such that about 1 gallon of aqueous glue solution is projected through the orifices 152 for about every 4 pounds of cellulose or other material projected through the cylindrical opening 144.

If the air is projected at angles other than as indicated above, the insulation is deposited unevenly; thus, the intraconical space in which the mixing takes place is critical. As the air and glue solution is projected out the orifices 152 and mixes with the dry cellulose being projected through the cylindrical opening 144, the force of the air and glue accelerates the dry cellulose. The vortex that is formed insures uniform coating of the cellulose by the glue, a critical requirement.

Preferably the cellulose is projected through the nozzle 114 at the rate of between about 400 to 2,700 pounds per hour, more preferably about 1,400 to 1,800 pounds per hour, the aqueous glue solution is delivered to the passageway 154 under a pressure of about 65 to 80 p.s.i.g., and the air delivered to the passageways 156 and 158 under a pressure of at least about 60 p.s.i.g. The air being projected through the passageways 156 and 158 breaks up the glue solution being projected through passageways 154 into small particles, a process somewhat akin to atomization. If the air is delivered at a pressure less than about 60 p.s.i.g., a rougher finish on the applied insulation is obtained. A similar result is achieved if the glue solution is delevered at a pressure less than about 65 p.s.i.g. The preferred air pressure is about 125 p.s.i.g., and the preferred glue pressure is about 80 p.s.i.g.

The pressures at which the glue solution and air is delivered will depend somewhat on the diameter of the orifices 152 through which they are projected. That is, if smaller diameter orifices 152 are used, the pressure will need to be increased in order to deliver the same quantities of glue and air, assuming other factors remain constant.

The rate the cellulose is delivered will vary depending upon the surface to which it is applied. That is, the material is normally applied to walls at a rate 2 to 3 times greater than it is applied to ceilings. This is because ceilings are generally more intricate than walls, having beams, structural supports and the like. Therefore, the insulation should be applied slower to get adequate coverage.

When it is desired to deliver the cellulose at a slower rate, the reducing ring 164 is inserted in the throat of the nozzle 114, the speed of the screw conveyor 40 is reduced, and the pressure at which the aqueous glue solution is delivered is reduced.

The optimum ratio of glue to water to cellulose, and the pressures under which the components are supplied to the nozzle will vary, depending on the surface to which the insulation is to be applied, and the rate it is to be applied, as well as the dimensions of the nozzle itself. A certain amount of condition varying will be necessary to achieve maximum results.

The process of this invention is demonstrated in the following example, which is intended to be illustrative, but not limiting.

EXAMPLE NO. 1:

Several bags of particulate cellulose material (ground-up newspapers) were dumped into a hopper. The material was agitated with a high speed agitator while in the hopper and carried out of the hopper by means of a screw conveyor located in the bottom thereof. The diameter of the shaft of the screw conveyor was 0.750 inch, and the diameter of the shaft plus spiral blade was 2 inches. The spiral blade had a 2 inch pitch, and extended about 37 inches along the shaft. The conveyor and agitator were both operated at a speed of about 1,725 r.p.m. The screw conveyor conveyed the material into the middle of a generally rectangular shaped venturi type conduit having one end open to the air and a centrifugal pump mounted on the other end. The cross-sectional area of each end of the conduit was 4 inches, and the cross-sectional area of the middle venturi section into which the screw conveyor emptied was approximately 3 square inches.

Material being emptied into the conduit by the screw conveyor was carried to the centrifugal pump by air being drawn in the open end as a result of the operation of the pump. The pump was a 1½ h.p. Tornado Blower, manufactured by the Breuer Electric Manufacturing Company, Chicago, Illinois. The pump had a beater mounted on the end of an elongated shaft which extended into the end of the conduit at which the pump was mounted. The beater comminuted the material being carried to the pump, breaking up any lumps which were present. The material was then pumped by the centrifugal pump into a flexible hose, and out the orifice of a nozzle attached to the mouth of the hose at the rate of about 1,000 pounds per hour, the nozzle being pointed in the desired direction. The orifice was 1.5 inches in diameter. Simultaneously with the projection of the material out the nozzle, it was mixed with a plurality of streams of aqueous glue solution (1 gallon E-6910 glue to 4 gallons water) and air issuing from a plurality of smaller orifices around the larger orifice. The smaller orifices were 0.030 inch in diameter. The arrangement of the smaller orifices was such that the streams of glue solution and air were projected at angles such that substantially all of the mixing took place in the intraconical space defined by a 45° right angle cone and a 60° right angular cone, having identical bases which are defined by a circle through the orifices through which the glue solution and air were being projected. The air and glue solution were delivered to the orifices through which they were projected under a pressure of 125 and 80 p.s.i.g., respectively.

The admixed aqueous glue and cellulose was applied to an interior wall of a building to a depth of about three-fourths inch. A uniform deposition was achieved with virtually no clumps visable. Very little of the deposited material failed to stick to the wall.

We claim:

1. In an apparatus for applying a mixture of fibrous insulation material, water and glue to a structural surface, a nozzle construction comprising a cylindrical center opening from which a mixture of air and fibrous material issues, a set of glue conduits having their discharge ends circumscribing said center opening, first and second sets of independent air conduits each having their discharge ends coinciding with one of said discharge ends of said glue orifices, said air conduits being angularly disposed relative to the path of issuance of said air and material mixture, and said sets of air conduits being angularly disposed relative to one another to define two distinct cones of air interposed in the path of issuance of said air and material mixture exteriorly of said nozzle, said cones of air deflecting the glue into and admixing the glue with said mixture of air and material.

2. In the apparatus of claim 1, the nozzle construction wherein said air discharge ends and said glue discharge ends are substantially equidistantly spaced around said cylindrical center opening with said sets of air conduits located radially outwardly of said glue conduits, wherein the ratio of the diameter of said air discharge ends and said glue discharge ends to the diameter of said cylindrical center opening is about 1 to 50, and wherein said distinct cones of air are 45° right angular and 60° right angular cones respectively.

3. Apparatus for applying particulate material to structural parts, comprising a frame, a hopper having an open bottom mounted on said frame, an agitator mounted in said hopper near the bottom thereof, a screw conveyor horizontally mounted at the bottom of said hopper, means for operating said agitator and screw conveyor at a desired speed, said conveyor emptying into the middle section of a conduit having first and second end sections and a middle section, said first end section being open to the atmosphere through which air can be drawn, said conduit being of smaller cross-sectional area in said middle section than at said first or second end sections whereby a venturi effect is created when air is drawn into said first end section of said conduit and passed through said middle section, a centrifugal pump having an inlet, an outlet, and an elongated shaft mounted on said second end section of said conduit, said shaft extending into said second end section of said conduit and having a beater mounted on the end thereof, a hose connected to the outlet of said centrifugal pump, a nozzle connected to said hose, said nozzle comprising a structure having a horizontal surface and a large orifice in the center thereof, said surface being beveled around said large orifice at an angle of substantially 30° relative to said surface of said structure to form an inwardly slanting face at the mouth of said large orifice, said slanting face containing a plurality of spaced apart small orifices therein encircling said large orifice, each of said spaced apart small orifices being the conjunction of a vertical passageway, a passageway having an angle of 45° relative to the center vertical axis of said large orifice, and a passageway having an angle of 30° relative to the center vertical axis of said large orifice, means for supplying a glue solution under pressure to said vertical passageway, means for supplying air under pressure to said passageway having an angle of 45° relative to the center vertical axis of said large orifice, and to said passageway having an angle of 30° relative to the center vertical axis of said large orifice, and electrical control means for said apparatus.

4. The apparatus of claim 3 in which said agitator is horizontally mounted in said hopper above said screw conveyor and comprises a shaft having a plurality of fingers extending outwardly therefrom, each finger being spaced around said shaft at an angle of 90° relative to the fingers adjacent to it.

5. Apparatus for applying particulate material to structural parts, comprising a frame, a hopper having an open bottom mounted on said frame, an agitator mounted in said hopper near the bottom thereof, a screw conveyor horizontally mounted at the bottom of said hopper, means for operating said agitator and screw conveyor at a desired speed, said conveyor emptying into the middle section of a conduit having first and second end sections and a middle section, said first end section being open to the atmosphere through which air can be drawn, said conduit being of smaller cross-sectional area in said middle section than at said first or second end sections whereby a venturi effect is created when air is drawn into said first end section of said conduit and passed through said middle section, a centrifugal pump having an inlet, an outlet, and an elongated shaft mounted on said second end section of said conduit, said shaft extending into said second end section of said conduit and having a beater mounted on the end thereof, a hose connected to the outlet of said centrifugal pump, a nozzle connected to said hose, said nozzle comprising a base comprising a tubular collar adapted to fit around the mouth of said hose and an outwardly projecting flange on top of said collar, said flange having a flat face and a large orifice in the center of said face whose diameter corresponds substantially in size to the interior diameter of said hose, said face also having an orifice connecting with a source of air, and an orifice connecting with a source of glue, a mixing head removably attached to said base comprising a circular disc-like piece having a flat surface and having an orifice in the center thereof which corresponds in size to said large orifice in the face of said flange, said head having an annular groove cut into the under surface thereof communicating with said orifice in said base connected to a source of glue, and a concentric annular groove cut into the under surface thereof communicating with said orifice in said base connected to a source of air, said surface of said head being beveled around said orifice in said surface at an angle of 30° relative to the surface of said head, forming a face, said face having a plurality of small orifices encircling said orifice in said head, each of said small orifices in said face being the conjunction of three passageways in said head, one passageway being positioned vertically relative to said flat surface of said head and communicating with said annular groove, the second of said passageways being positioned at an angle of 30° relative to the vertical axis of said orifice in said head, and the third of said passageways being situated at an angle of 45° relative to the vertical axis of said orifice in said head, the second and third of said passageways communicating with said concentric annular groove in said head, means for supplying a glue solution under pressure to said vertical passageway, means for supplying air under pressure to said second and third passageways, and electrical control means for said apparatus.

* * * * *